United States Patent
Kim et al.

(10) Patent No.: US 9,621,571 B2
(45) Date of Patent: Apr. 11, 2017

(54) APPARATUS AND METHOD FOR SEARCHING FOR SIMILAR MALICIOUS CODE BASED ON MALICIOUS CODE FEATURE INFORMATION

(71) Applicant: ELECTRONICS AND TELECOMMUNICATIONS RESEARCH INSTITUTE, Daejeon (KR)

(72) Inventors: Dongphil Kim, Daejeon (KR); Inkyoung Kim, Daejeon (KR); Seokwoo Choi, Daejeon (KR); Taejoo Chang, Daejeon (KR); Wonho Kim, Daejeon (KR); Hyunggeun Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 22 days.

(21) Appl. No.: 14/788,831

(22) Filed: Jul. 1, 2015

(65) Prior Publication Data

US 2016/0072833 A1    Mar. 10, 2016

(30) Foreign Application Priority Data

Sep. 4, 2014    (KR) .................... 10-2014-0117598

(51) Int. Cl.
*H04L 29/06*    (2006.01)
*G06F 17/30*    (2006.01)
*G06F 21/56*    (2013.01)

(52) U.S. Cl.
CPC .... *H04L 63/1425* (2013.01); *G06F 17/30675* (2013.01); *G06F 21/561* (2013.01);
(Continued)

(58) Field of Classification Search
None
See application file for complete search history.

(56) References Cited

U.S. PATENT DOCUMENTS 8,225,405 B1 * 7/2012 Peterson ............... H04L 63/145
                                                                    713/187
8,590,016 B2 * 11/2013 Kim ..................... G06F 21/568
                                                                    709/206

(Continued)

FOREIGN PATENT DOCUMENTS

KR    10-2011-0086198 A    7/2011
KR    10-2011-0088042 A    8/2011

(Continued)

OTHER PUBLICATIONS

Igor Santos et al., "NOA: An Information Retrieval Based Malware Detection System," Computing and Informatics, 2013, vol. 32, pp. 145-174.

*Primary Examiner* — Hadi Armouche
*Assistant Examiner* — Andrew Steinle
(74) *Attorney, Agent, or Firm* — LRK Patent Law Firm

(57) ABSTRACT

An apparatus and method for searching for similar malicious code based on malicious code feature information. The apparatus includes a malicious code registration unit for registering input new malicious code as a new malicious code sample, and extracting and registering detailed information of the new malicious code sample, a malicious code analysis unit for analyzing the detailed information of the new malicious code sample, a malicious code DNA extraction unit for extracting malicious code DNA information including malicious code feature information, a malicious code DNA comparison unit for comparing the extracted malicious code DNA information with malicious code DNA information of prestored malicious code samples, and calculating similarities therebetween, and a similar malicious (Continued)

code search unit for calculating, based on the calculated similarities, all similarities between the new malicious code sample and prestored malicious code samples, and extracting a specific number of malicious code samples.

8 Claims, 4 Drawing Sheets

(52) U.S. Cl.
CPC .......... *G06F 21/564* (2013.01); *G06F 21/566* (2013.01); *H04L 63/101* (2013.01); *H04L 63/145* (2013.01); *H04L 63/1408* (2013.01)

(56) References Cited

U.S. PATENT DOCUMENTS

2006/0253581 A1* 11/2006 Dixon ............... G06F 17/30861
709/225
2013/0014260 A1* 1/2013 Lee ....................... G06F 21/567
726/24
2013/0185797 A1* 7/2013 Zhou ...................... G06F 21/52
726/23
2013/0333038 A1* 12/2013 Chien ................. H04L 63/1408
726/23
2014/0068768 A1* 3/2014 Lospinuso ............ G06F 21/562
726/23
2016/0065594 A1* 3/2016 Srivastava .......... H04L 63/1408
726/23

FOREIGN PATENT DOCUMENTS

KR   10-2012-0071817 A   7/2012
KR   10-2013-0076266 A   7/2013
KR       10-1404882 B1   6/2014

* cited by examiner

US 9,621,571 B2

APPARATUS AND METHOD FOR SEARCHING FOR SIMILAR MALICIOUS CODE BASED ON MALICIOUS CODE FEATURE INFORMATION

CROSS REFERENCE TO RELATED APPLICATION

This application claims the benefit of Korean Patent Application No. 10-2014-0117598, filed Sep. 4, 2014, which is hereby incorporated by reference in its entirety into this application.

BACKGROUND OF THE INVENTION

1. Technical Field

The present invention generally relates to an apparatus and method for searching for similar malicious code based on malicious code feature information and, more particularly, to an apparatus and method that automatically analyze samples suspected to be malicious, check for similarities between the suspected samples and existing malicious samples, and search for the most similar malicious samples.

2. Description of the Related Art

For recent 10 years, the amount of malicious code (malware) that is discovered every day has rapidly increased from less than 10 times on average per day in the past. Nowadays, malicious code is discovered 3000 or more times on average per day.

However, it is known that most malicious code that is discovered is not a new type of malicious code, but is variant malicious code created by adding some functions to existing malicious code or by artificially forging existing malicious code so as to avoid antivirus scanning.

In particular, a large amount of variant malicious code, which has functions similar or identical to those of existing malicious code but has formats different from them, has appeared for reasons such as the use of an automatic malicious code production tool, the reuse of existing malicious code, or the application of deformation techniques for scanning avoidance.

If all inflowing malicious code is processed in the usual way, the functions thereof must be respectively and newly analyzed, and new antivirus detection patterns must be developed to be applied to antivirus software. This causes problems related to the deterioration of antivirus performance and excessive analysis time.

Therefore, to effectively cope with the increasing amount of malicious code, inflowing malicious code must be classified into new types of malicious code and variant malicious code. When malicious code is determined to be a new type of code, it must be newly analyzed and processed in detail. When malicious code is determined to be variant code, the difference from existing malicious code must be analyzed, so that previously processed portions and remaining portions must be checked, and so that portions that must be processed can be additionally processed. Further, the results of analysis and processing must be stored and used in order to be prepared for malicious code that will occur in the future.

A technique for calculating similarities between a new malicious code sample and existing analyzed malicious code may be performed in the sequence of normalization, comparison factor extraction, and comparison factor comparison and analysis. Here, the extraction of comparison factors may be classified into a dynamic extraction scheme and a static extraction scheme. Such a dynamic comparison factor extraction scheme is a scheme for utilizing pieces of behavioral information, which appear when malicious code is executed using an emulator, as a comparison factor required for similarity calculation. In contrast, a scheme for extracting a comparison factor via static analysis extracts an Application Programming Interface (API) list present in an Import Address Table (IAT) and utilizes the API list as a comparison factor, or extracts a character string and utilizes the character string as a comparison factor. Also, there is research into technology for extracting a Control Flow Graph (CFG) relationship between functions of malicious code and utilizing it as a comparison factor.

In this way, as the amount of malicious code that occurs has rapidly increased, research into automatic malicious code analysis for automatically analyzing a large number of malicious samples has been actively conducted. In particular, since many pieces of malicious code that have recently been detected are determined to be variants of existing malicious samples, demand has also increased for a system that automatically determines whether malicious code is a variant of existing malicious code and whether producers of the malicious code are the same as those of existing malicious code upon automatically analyzing malicious code.

As related preceding technology, Korean Patent Application Publication No. 2011-0088042 discloses technology that can automatically classify and distinguish new malicious code even without analyzing all malicious code samples, the number of which is exponentially increasing.

As another related preceding technology, technology for statically and automatically analyzing malicious code and determining whether samples are malicious samples was published in Jun. 2-3, 2012 in the paper entitled "NOA: An Information Retrieval Based Malware Detection System" (by IGOR SANTOS and three others in Computing and Informatics, VOL. 32, NO 1).

SUMMARY OF THE INVENTION

Accordingly, the present invention has been made keeping in mind the above problems occurring in the prior art, and an object of the present invention is to provide an apparatus and method for searching for similar malicious code based on malicious code feature information, which search for malicious samples having the highest similarity based on similarities to existing malicious samples, output pieces of similar data, and provide information about producer groups of the corresponding malicious samples to an analyst, thus allowing the analyst to utilize the producer group information for detailed analysis.

In accordance with an aspect of the present invention to accomplish the above object, there is provided an apparatus for searching for similar malicious code based on malicious code feature information, including a malicious code registration unit for registering input new malicious code as a new malicious code sample, and extracting and registering detailed information of the new malicious code sample; a malicious code analysis unit for analyzing the detailed information of the new malicious code sample; a malicious code DNA extraction unit for extracting malicious code DNA information including malicious code feature information, based on analyzed malicious code information output from the malicious code analysis unit; a malicious code DNA comparison unit for comparing the extracted malicious code DNA information with malicious code DNA information of restored malicious code samples, for each DNA type, and then calculating similarities therebetween for each DNA type; and a similar malicious code search unit for calculating, based on the similarities calculated by the malicious code DNA comparison unit, all similarities between the new malicious code sample and the prestored malicious code samples, and extracting a specific number of malicious code samples as a result of searching for similar malicious code.

The detailed information of the new malicious code sample may include one or more of a file name of the new malicious code sample, a file format of the new malicious code sample, a file generation time and date of the new malicious code sample, a size of the new malicious code sample, a file hash value, and a file upload time.

The malicious code feature information may include application Programming Interface call (APICALL) information, network information, IMPORT, EXPORT, Mutually exclusive (Mutex) and DROP files, file generation and open information, registry change information, string information, and function-based instruction sequence information.

The malicious code DNA comparison unit may calculate the similarities using a ratio of an intersection of two pieces of DNA information of the new malicious code sample and each prestored malicious code sample to a union of the two pieces of DNA information.

The similar malicious code search unit may calculate all similarities between the new malicious code sample and the prestored malicious code samples using a cosine similarity calculation algorithm, and extract a specific number of malicious code samples in descending order of higher similarity.

The new malicious code sample may be input through a user interface of a web server, and a type of DNA on which similarity calculation is to be performed by the malicious code DNA comparison unit may be registered through the user interface.

The apparatus may further include a whitelist comparison unit for determining, based on a comparison, whether the malicious code DNA information extracted by the malicious code DNA extraction unit is present in a prestored whitelist, the whitelist comparison unit being configured to, when the extracted malicious code DNA information is present in the prestored whitelist, exclude the corresponding DNA information from the malicious code DNA information.

The apparatus may further include a blacklist comparison unit for determining, based on a comparison, whether the malicious code DNA information extracted by the malicious code DNA extraction unit is present in a prestored blacklist, the blacklist comparison unit being configured to, when the extracted malicious code DNA information is present in the prestored blacklist, display and store the corresponding DNA information as information included in the blacklist.

The blacklist comparison unit may provide, through the user interface of the web server, notification that the new malicious code sample includes blacklist data, as the corresponding DNA information is displayed as information included in the blacklist.

The apparatus may further include a database for storing detailed information of the new malicious code sample, malicious code DNA information extracted by the malicious code DNA extraction unit, and a result of searching for similar malicious code.

In accordance with another aspect of the present invention to accomplish the above object, there is provided a method for searching for similar malicious code based on malicious code feature information, including registering, by a malicious code registration unit, input new malicious code as a new malicious code sample, and extracting and registering detailed information of the new malicious code sample; analyzing, by a malicious code analysis unit, the detailed information of the new malicious code sample; extracting, by a malicious code DNA extraction unit, malicious code DNA information including malicious code feature information, based on analyzed malicious code information; comparing, by a malicious code DNA comparison unit, the extracted malicious code DNA information with malicious code DNA information of prestored malicious code samples, for each DNA type, and then calculating similarities therebetween for each DNA type; and calculating, by a similar malicious code search unit, based on the similarities calculated in similarity calculation, all similarities between the new malicious code sample and the prestored malicious code samples, and extracting a specific number of malicious code samples as a result of searching for similar malicious code.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
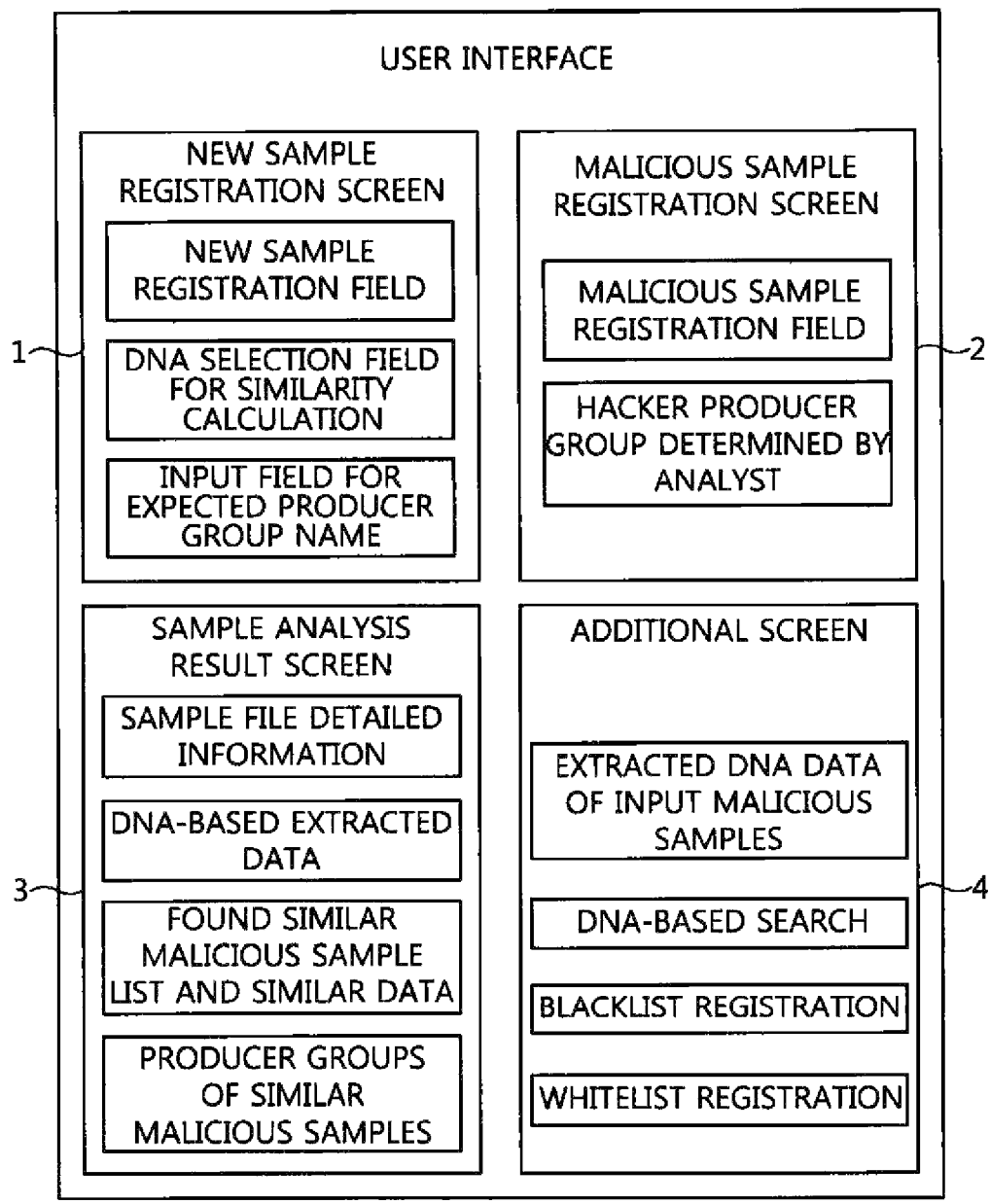
FIG. 1 is a functional diagram showing a user interface employed in the description of an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a functional diagram showing a user interface employed in the description of an embodiment of the present invention. The user interface of FIG. 1 may be regarded as being installed in a web server 10 (see FIG. 2).

The user interface includes a new sample registration screen 1, a malicious sample registration screen 2, a sample analysis result screen 3, and an additional screen 4.

The user interface may include a new sample registration function for registering new samples, a function for selecting deoxyribonucleic acid (DNA) to use as a basis for comparison in order to search for similar samples, and a function of inputting a producer group name, which is expected for each sample. For this, on the new sample registration screen 1, items such as a new sample registration field, a field for selection of DNA, on which similarity is to be calculated, and an expected producer group name input field are displayed.

Further, the user interface may include a function of registering a sample determined to be a malicious sample produced by a specific group via detailed analysis by an analyst, and a function of inputting the producer group of the malicious sample. For this, on the malicious sample registration screen 2, items such as a malicious sample registration field and a field for a hacker producer group or the like, as determined by the analyst, are displayed.

When a new sample is input via the new sample registration screen 1, DNA extraction is performed, and an extracted DNA value is compared with the DNA values of existing malicious samples to calculate similarities therebetween. After similarity calculation, when a similar malicious code is found in the malicious sample DB, the detailed information of the new sample, extraction results for respective DNA values, a list of similar malicious samples, which are found via similarity calculation, and pieces of similar data for respective DNA values may be output via the sample analysis result screen 3. Further, producer groups of similar malicious samples found using the similar malicious samples may be output via the sample analysis result screen 3. For this, on the sample analysis result screen 3, items such as detailed information of each sample file, pieces of data extracted for respective DNA values, a list of found similar malicious samples and similar data, and the producer groups of similar malicious samples are displayed.

Meanwhile, the user interface may include a function of outputting pieces of data obtained by extracting malicious samples registered via the malicious sample registration screen 2 for respective DNA values, and a function of searching the malicious sample DB for malicious samples having the same data upon searching for specific data for respective DNA values. Also, the user interface may include a function of registering data needing to be registered in a blacklist or a whitelist while the analyst is checking the results of analysis obtained by the present system. For this, on the additional screen 4, items such as DNA extraction data for input malicious samples, DNA-based search, the registration of a blacklist, and the registration of a whitelist are displayed.

Figure 2:
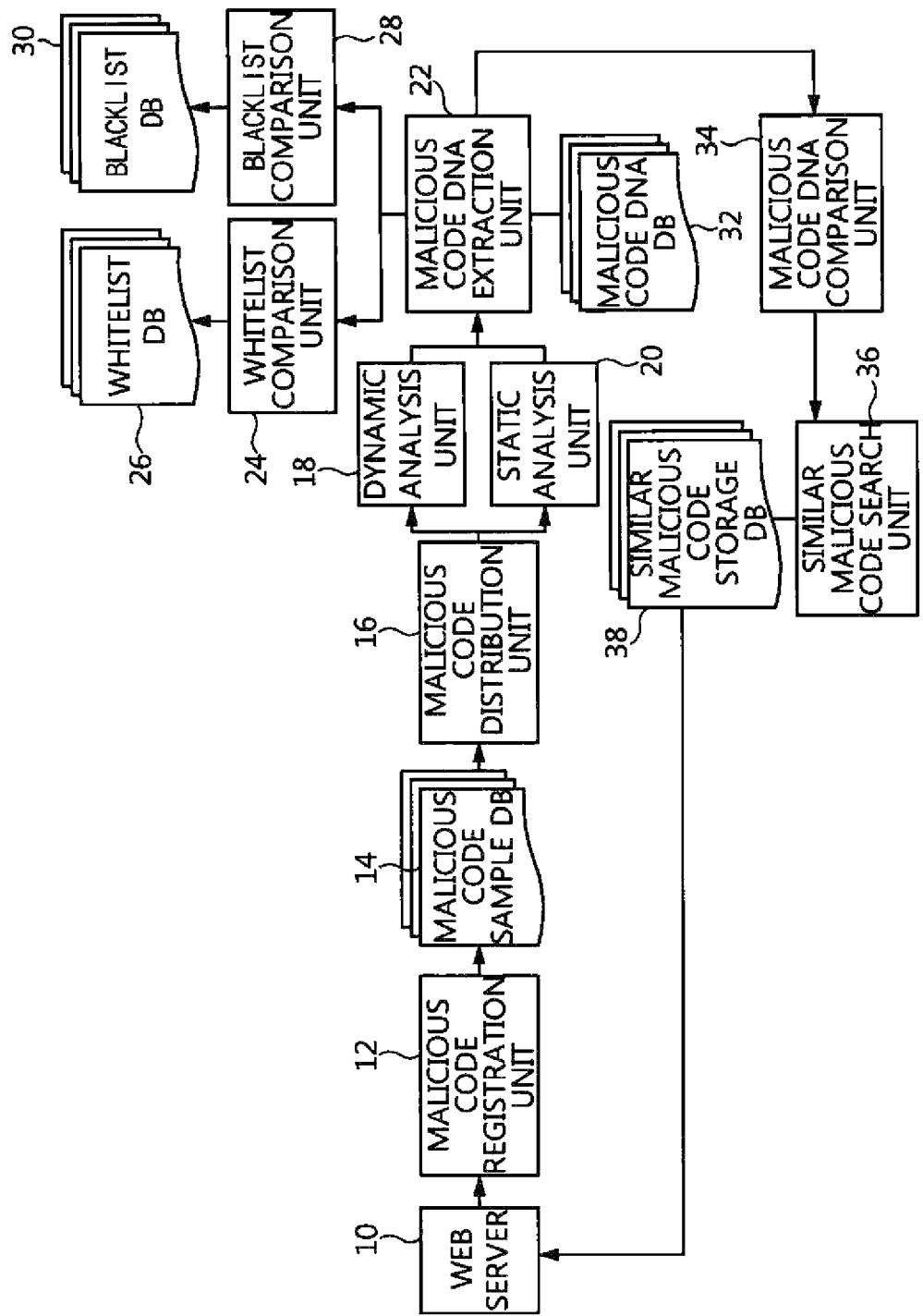
FIG. 2 is a configuration diagram showing an apparatus for searching for similar malicious code based on malicious code feature information according to an embodiment of the present invention.

FIG. 2 is a configuration diagram showing an apparatus for searching for similar malicious code based on malicious code feature information according to an embodiment of the present invention.

The apparatus for searching for similar malicious code based on malicious code feature information according to the embodiment of the present invention includes a malicious code registration unit 12, a malicious code sample DB 14, a malicious code distribution unit 16, a dynamic analysis unit 18, a static analysis unit 20, a malicious code DNA extraction unit 22, a whitelist comparison unit 24, a whitelist DB 26, a blacklist comparison unit 28, a blacklist DB 30, a malicious code DNA DB 32, a malicious code DNA comparison unit 34, a similar malicious code search unit 36, and a similar malicious code storage DB 38.

The malicious code registration unit 12 registers and deletes new malicious code, and outputs pieces of malicious code DNA information (malicious code DNA values) extracted via dynamic analysis and static analysis. Further, the malicious code registration unit 12 may output 10 similar malicious code samples from the existing malicious code sample DB 14, based on the similarities calculated by the malicious code DNA comparison unit 34.

The malicious code sample DB 14 stores malicious code samples registered by the malicious code registration unit 12 via the web server 10. For example, the malicious code sample DB 14 may store the file name of each new malicious code sample, the file format of each new malicious code sample, the file generation time and date of each new malicious code sample, the size of each new malicious code sample, file hash values, file upload time information, etc.

In FIG. 2, although the malicious code registration unit 12 and the malicious code sample DB 14 have been shown as separate components, the malicious code sample DB 14 may be included in the malicious code registration unit 12.

The malicious code distribution unit 16 fetches malicious code samples registered by the malicious code registration unit 12 via the web server 10 from the malicious code sample DB 14, and transfers the malicious code samples to the dynamic analysis unit 18 and to the static analysis unit 20.

The dynamic analysis unit 18 actually executes the malicious code sample requested to be analyzed by the malicious code distribution unit 16 in a virtual environment. The dynamic analysis unit 18 may monitor API information that is called during the execution of the malicious code sample, network information (information about IP addresses or URLs to which access is requested), etc.

The static analysis unit 20 may extract the malicious code sample requested to be analyzed by the malicious code distribution unit 16 on a function basis using a reverse engineering procedure, in the form of assembly language code and intermediate language code (e.g., C language code).

In this case, the dynamic analysis unit 18 and the static analysis unit 20 may be collectively designated as a malicious code analysis unit for extracting analyzed malicious code information.

The malicious code DNA extraction unit 22 extracts pieces of malicious code feature information from pieces of analyzed malicious code information extracted by the dynamic analysis unit 18 and the static analysis unit 20. More specifically, the malicious code DNA extraction unit 22 extracts information about APICALLs called in a malicious code operation procedure by the dynamic analysis unit 18, network information (IP address or Domain Name System (DNS) information), IMPORT, EXPORT, Mutually Exclusive (Mutex) and DROP files, file generation and file open information, registry change information, character string information, etc. Further, the malicious code DNA extraction unit 22 calculates a fuzzy hash value only using function-based instruction sequence information among pieces of information extracted by the static analysis unit 20. Here, the APICALL information, network information (IP address or DNS information), IMPORT, EXPORT, Mutex and DROP files, file generation and file open information, registry change information, character string information, function-based instruction sequence information, etc. may be regarded as examples of malicious code feature information.

The whitelist comparison unit 24 detects information unrelated to malicious code feature information from pieces of DNA information extracted by the malicious code DNA extraction unit 22, and removes the detected information from the extracted malicious code DNA information. The whitelist comparison unit 24 may detect pieces of information unrelated to malicious code feature information, based on the information stored in the whitelist DB 26.

The whitelist DB 26 stores pieces of information determined to be unrelated to malicious code feature information. The whitelist DB 26 allows an analyst to register whitelists via the web server 10 based on the pieces of information extracted via dynamic analysis and static analysis.

In FIG. 2, although the whitelist comparison unit 24 and the whitelist DB 26 have been shown as separate components, the whitelist DB 26 may be included in the whitelist comparison unit 24.

The blacklist comparison unit 28 detects data matching the data of a blacklist from pieces of DNA information extracted by the malicious code DNA extraction unit 22. The blacklist comparison unit 28 may display data matching the data of the blacklist, and then notify the analyst of the matching data through the user interface of the web server 10.

The blacklist DB 30 is a blacklist storage place in which analysis experiences of the analyst are stored. In other words, the analyst selects pieces of DNA information, determined to be associated with malicious behavior in an analysis procedure, for the blacklist, and stores the blacklist in the blacklist DB 30 for each piece of malicious code DNA information. Accordingly, after the malicious code feature information has been extracted upon analyzing samples, the blacklist comparison unit 28 may notify the analyst of the results of blacklist-based detection through the user interface, by means of comparison with pieces of information stored in the blacklist DB 30.

In FIG. 2, although the blacklist comparison unit 28 and the blacklist DB 30 are shown as separate components, the blacklist DB 30 may be included in the blacklist comparison unit 28.

The malicious code DNA DB 32 stores pieces of malicious code DNA information extracted by the malicious code DNA extraction unit 22.

In FIG. 2, although the malicious code DNA extraction unit 22 and the malicious code DNA DB 32 are shown as separate components, the malicious code DNA DB 32 may be included in the malicious code DNA extraction unit 22.

The malicious code DNA comparison unit 34 compares newly registered malicious code (i.e., a new malicious code sample) with malicious code samples previously registered in the malicious code sample DB 14, and then calculates similarities therebetween. That is, the malicious code DNA comparison unit 34 compares the DNA information of the malicious code sample extracted by the malicious code DNA extraction unit 22 with the malicious code DNA information of malicious code samples prestored in the malicious code sample DB 14, for respective DNA types, and then calculates similarities therebetween. Here, the calculation of similarities may be performed using an equation corresponding to the ratio of the intersection of pieces of extracted DNA information of two malicious code samples to the union of the pieces of extracted DNA information.

The similar malicious code search unit 36 calculates all similarities based on the similarities calculated by the malicious code DNA comparison unit 34 for respective DNA values, extracts 10 pieces of malicious code (10 malicious code samples) in descending order of higher similarity, and stores the extracted 10 malicious code samples in the similar malicious code storage DB 38. Here, information stored in the similar malicious code storage DB 38 is output as the results of a similar malicious code search related to the corresponding sample to the analyst through the user interface of the web server 10.

In FIG. 2, although the similar malicious code search unit 36 and the similar malicious code storage DB 38 are shown as separate components, the similar malicious code storage DB 38 may be included in the similar malicious code search unit 36.

In FIG. 2 described above, the malicious code registration unit 12, the malicious code distribution unit 16, the malicious code DNA extraction unit 22, the whitelist comparison unit 24, the blacklist comparison unit 28, the malicious code DNA comparison unit 34, and the similar malicious code search unit 36 may be collectively designated as a control unit.

Further, in FIG. 2, the malicious code sample DB 14, the malicious code DNA DB 32, the whitelist DB 26, the blacklist DB 30, and the similar malicious code storage DB 38 may be collectively designated as a DB unit.

Figure 3:
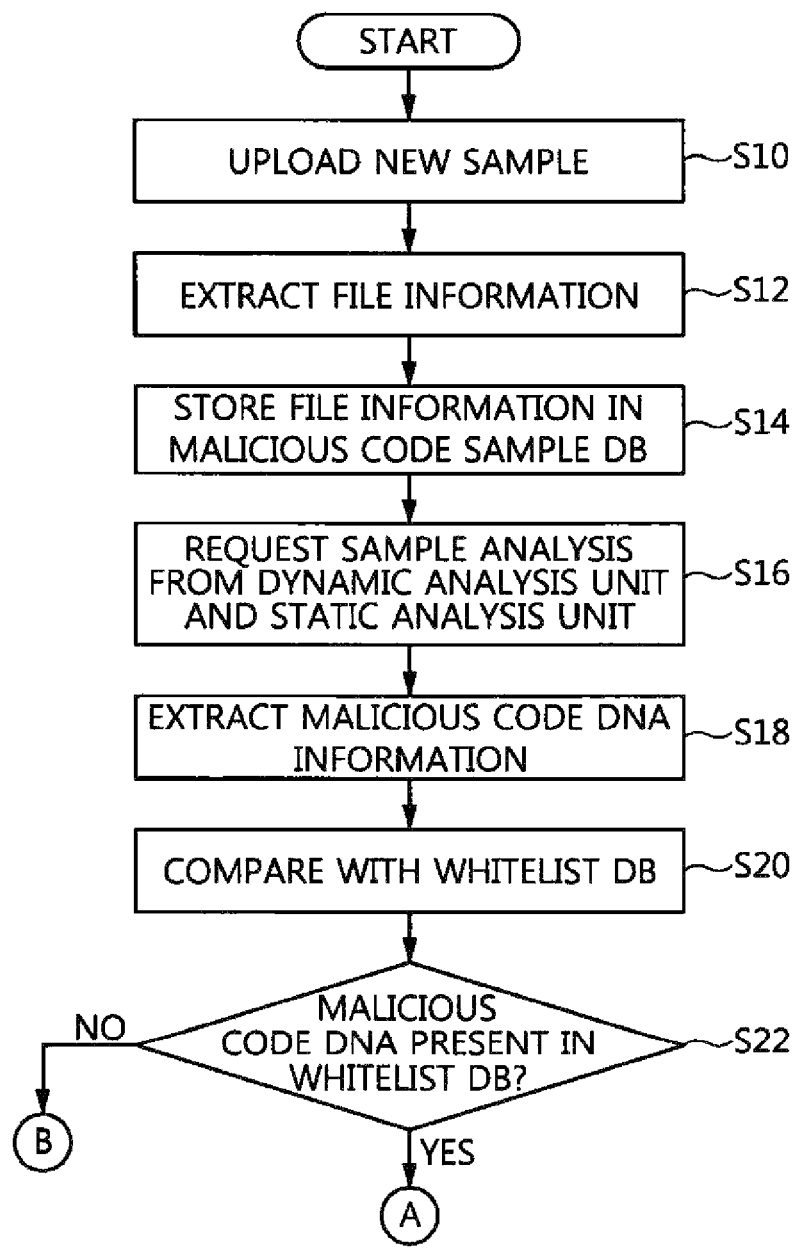
FIGS. 3 and 4 are flowcharts showing a method for searching for similar malicious code based on malicious code feature information according to an embodiment of the present invention.
Figure 4:
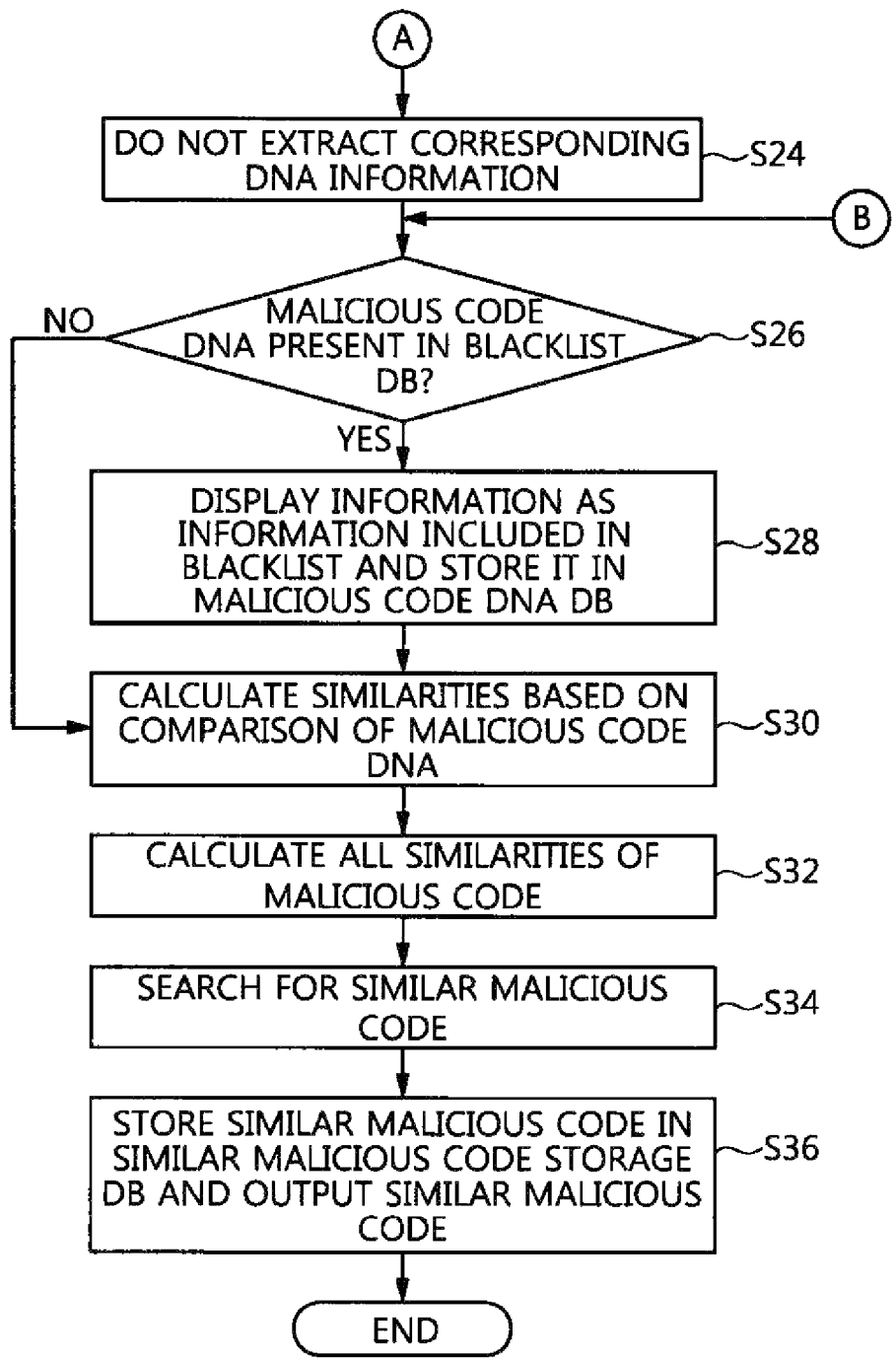

FIGS. 3 and 4 are flowcharts showing a method for searching for similar malicious code based on malicious code feature information according to an embodiment of the present invention.

First, the analyst uploads new malicious code (i.e., a new file format sample) to the malicious code registration unit 12 through a user interface installed on the web server 10 at step S10. That is, after the similar malicious code search apparatus (system) using the extraction of malicious code feature information has been executed, a new sample (new malicious code) is uploaded through the user interface.

Accordingly, the malicious code registration unit 12 extracts the detailed information of the corresponding file at step S12. Here, the malicious code registration unit 12 may extract information such as the file name of malicious code, the file format of malicious code (determine whether the corresponding file is a Portable Executable (PE) file, a Disk Operating System (DOS) file, or a Joint Photographic Experts Group (JPEG) file), the file generation time/date of malicious code (only date is present for a PE file), file upload time, file size, and file hash (MD5 or SHA-1) values.

Further, the malicious code registration unit 12 stores the extracted file information (that is, detailed information) in the malicious code sample DB 14 at step S14.

Thereafter, the malicious code distribution unit 16 uploads newly stored sample information to the data structures (queues) of the dynamic analysis unit 18 and the static analysis unit 20. That is, the malicious code distribution unit 16 calls the dynamic analysis unit 18 and the static analysis unit 20 and requests the analysis of the malicious code sample newly registered in the malicious code sample DB 14 at step S16.

The dynamic analysis unit 18 dynamically expresses actions by actually executing the malicious code sample. Accordingly, the dynamic analysis unit 18 monitors API information called during the execution of the malicious code sample, and network information (information about IP addresses and URLs to which access is requested). Further, the static analysis unit 20 generates assembly language code and intermediate language (C language) code on a function basis using a reverse engineering tool such as Interactive Disassembler (IDA) Pro.

As described above, the results of extraction via the dynamic analysis unit 18 and the static analysis unit 20 are transmitted to the malicious code DNA extraction unit 22. The malicious code DNA extraction unit 22 extracts malicious code DNA information from data received through the malicious code distribution unit 16. That is, the DNA information extracted by the dynamic analysis unit 18 and the static analysis unit 20 is re-extracted as 10 pieces of DNA information defined as malicious code feature information by the malicious code DNA extraction unit 22 at step S18. Here, the 10 pieces of DNA information defined as the malicious code feature information may include APICALL, STRING, DROPS, IMPORTS, EXPORTS, FILES, KEYS, MUTEXES, NETWORK, and FUNCTIONS. Among the 10 pieces of DNA information, function information (FUNCTIONS) is stored in such a way that only instructions (opcodes) are extracted from assembly data of functions included in malicious code samples and are converted into character strings and thereafter ssdeep fuzzy hash values are generated and stored in the function table of the malicious code DNA DB 32 in the form of a file. The above-described 10 pieces of DNA information are presented by way of example, but more than 10 pieces or less than 10 pieces of DNA information may be used if necessary.

When the DNA information defined as the malicious code feature information is extracted in this way, filtering is performed via the whitelist DB 26 and the blacklist DB 30.

That is, the whitelist comparison unit 24 compares the malicious code DNA information extracted by the malicious code DNA extraction unit 22 with the whitelist DB 26 in which normal DNA information is stored at step S20.

As a result of the comparison, if the extracted malicious code DNA information is present in the whitelist DB 26 (Yes at step S22), the extracted code DNA information is regarded as normal DNA information and is then excluded from malicious code DNA information at step S24.

In contrast, the blacklist comparison unit 28 compares the malicious code DNA information extracted by the malicious code DNA extraction unit 22 with information included in the blacklist DB 30 and determines whether blacklist DNA information that matches the extracted DNA information is present at step S26. As a result, the blacklist comparison unit 28 indicates the matching DNA information as a blacklist upon storing the DNA information in the malicious code DNA DB 32, and notifies the analyst that the extracted DNA information is information matching the blacklist, through the user interface.

In this way, the malicious code DNA extraction unit 22 stores information filtered by the whitelist comparison unit 24 and the blacklist comparison unit 28 (i.e., malicious code DNA information) in the malicious code DNA DB 32 for each DNA value at step S28. Information stored in the malicious code DNA DB 32 is output as analyzed information for the corresponding malicious code sample through the user interface.

Thereafter, the malicious code DNA comparison unit 34 compares the malicious code DNA information newly added to the malicious code DNA DB 32 with pieces of prestored malicious code DNA information for each DNA type, and then calculates similarities therebetween at step S30. In a similarity calculation procedure, APICALL compares API calling sequences with each other (sequence matching scheme) together with the names of APIs. Meanwhile, character strings (STRING), NETWORK, IMPORTS, EXPORTS, MUTEXES, FILES, registry, and drop files (DROPS) use a set intersection algorithm. Further, function information (FUNCTIONS) in DNA information is used to calculate similarities between functions using an ssdeep fuzzy hash algorithm. In particular, as the function information stored in the malicious code DNA DB 32, function-based ssdeep fuzzy hash information extracted by the static analysis unit 20 is stored, and the calculation of the function similarity between the two samples is performed by calculating similarities between functions included in two samples, based on ssdeep-based fuzzy hash, and by obtaining the average of the similarities.

Then, the similar malicious code search unit 36 calculates all similarities between comparative malicious code samples, based on similarities calculated for respective DNA values by the malicious code DNA comparison unit 34 at step S32. For example, the similar malicious code search unit 36 may calculate all similarities between comparative malicious code samples using a cosine similarity algorithm.

Next, the similar malicious code search unit 36 extracts, in descending order of higher similarity, the 10 similar pieces of malicious code that have the highest degree of similarity at step S34. In other words, the similar malicious code search unit 36 calculates all similarities between malicious code samples, based on similarities for respective DNA values calculated by the malicious code DNA comparison unit 34, and searches for the 10 most similar pieces of malicious code. Here, although the present embodiment is described as searching for the 10 most similar pieces of malicious code, a number of similar pieces of malicious code greater or less than 10 pieces of malicious code may be searched for depending on the circumstances.

Further, the similar malicious code search unit 36 stores the extracted 10 most similar pieces of malicious code in the similar malicious code storage DB 38. For example, the similar malicious code search unit 36 may store hacker group information of the found 10 most similar pieces of malicious code (i.e., malicious code samples) in the similar malicious code storage DB 38.

Hence, information stored in the similar malicious code storage DB 38 is output as the results of a similar malicious code search related to the corresponding sample to the analyst through the user interface of the web server 10 at step S36.

In this way, the above-described embodiment of the present invention performs static analysis and dynamic analysis of malicious code samples. Thereafter, after pieces of malicious code feature information have been extracted, the 10 pieces of malicious code determined to be the most similar are found via the calculation of the similarities between the pieces of extracted malicious code feature information. By means of this, hacker group information of the similar malicious code may be checked, and may be used as data required to determine whether hacker groups of similar pieces of malicious code are the same hacker group.

In accordance with the present invention having the above configuration, pieces of malicious code feature information are extracted via dynamic analysis and static analysis and are compared with malicious code feature information of existing malicious samples, and then the 10 samples having the highest degree of similarity may be automatically found from a search.

When the present invention is utilized, a large number of samples may be, rapidly and initially analyzed. In particular, whether malicious behavior has occurred may be promptly determined using blacklist DBs for respective DNA values constructed via an analyst's analysis experience.

Further, the present invention searches an existing malicious sample DB for similar malicious samples, thus detecting pieces of deformed feature information due to variants. Accordingly, producer groups of malicious samples may be inferred, and then referred to when determining the purpose of distribution or the intention of execution of the malicious code.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for searching for similar malicious code based on malicious code feature information, comprising:
    registering, by a malicious code registration unit, input new malicious code as a new malicious code sample, and extracting and registering detailed information of the new malicious code sample;
    analyzing, by a malicious code analysis unit, the detailed information of the new malicious code sample;
    extracting, by a malicious code DNA extraction unit, malicious code DNA information including malicious code feature information, based on analyzed malicious code information;
    comparing, by a malicious code DNA comparison unit, the extracted malicious code DNA information with malicious code DNA information of prestored malicious code samples, for each DNA type, and then calculating similarities therebetween for each DNA type; and
    calculating, by a similar malicious code search unit, based on the similarities calculated in similarity calculation, all similarities between the new malicious code sample and the prestored malicious code samples, and extracting a specific number of malicious code samples as a result of searching for similar malicious code,
    wherein the malicious code feature information comprises Application Programming Interface call (APICALL) information, network information, IMPORT, EXPORT, Mutually exclusive (Mutex) and DROP files, file generation and open information, registry change information, string information, and function-based instruction sequence information.

2. The method of claim 1, wherein the detailed information of the new malicious code sample comprises one or more of a file name of the new malicious code sample, a file format of the new malicious code sample, a file generation time and date of the new malicious code sample, a size of the new malicious code sample, a file hash value, and a file upload time.

3. The method of claim 1, wherein extracting the specific number of malicious code samples as the result of searching for similar malicious code comprises calculating all similarities between the new malicious code sample and the prestored malicious code samples using a cosine similarity calculation algorithm, and extracting a specific number of malicious code samples in descending order of higher similarity.

4. The method of claim 1, wherein: the new malicious code sample is input through a user interface of a web server, and a type of DNA on which similarity calculation is to be performed upon performing the similarity calculation for each DNA type is registered via the user interface.

5. The method of claim 1, further comprising determining, by a whitelist comparison unit, based on a comparison, whether the extracted malicious code DNA information is present in a prestored whitelist, and, when the extracted malicious code DNA information is present in the prestored whitelist, excluding the corresponding DNA information from the malicious code DNA information.

6. The method of claim 1, further comprising determining, by a blacklist comparison unit, based on a comparison, whether the extracted malicious code DNA information is present in a prestored blacklist, and when the extracted malicious code DNA information is present in the prestored blacklist, displaying and storing the corresponding DNA information as information included in the blacklist.

7. The method of claim 6, wherein displaying and storing the corresponding DNA information as the information included in the blacklist comprises providing, through a user interface of a web server, notification that the new malicious code sample includes blacklist data as the corresponding DNA information is displayed as the information included in the blacklist.

8. The method of claim 1, wherein calculating the similarities for each DNA type comprises calculating the similarities using a ratio of an intersection of two pieces of DNA information of the new malicious code sample and each prestored malicious code sample to a union of the two pieces of DNA information.

* * * * *